United States Patent [19]

Pickelman et al.

[11] Patent Number: 4,544,697
[45] Date of Patent: Oct. 1, 1985

[54] AMPHOTERIC LATEXES CONTAINING PH INDEPENDENT AND PH DEPENDENT BOUND CHARGES

[75] Inventors: Dale M. Pickelman, Auburn; Larry D. Yats, Clare, both of Mich.

[73] Assignee: The Dow Chemical Company, Midland, Mich.

[21] Appl. No.: 554,034

[22] Filed: Nov. 21, 1983

[51] Int. Cl.$^4$ .................... C08F 2/16; C08L 9/04
[52] U.S. Cl. .................................... 524/458
[58] Field of Search ......................... 524/458

[56] References Cited

U.S. PATENT DOCUMENTS

| | | | |
|---|---|---|---|
| 3,424,706 | 1/1969 | Smith et al. | 524/458 |
| 3,580,880 | 5/1971 | Clarke et al. | 524/457 |
| 3,637,565 | 1/1972 | Sheetz | 524/816 |
| 3,759,861 | 9/1973 | Shimokawa | 524/458 |
| 3,760,035 | 9/1973 | Kelley | 524/458 |
| 4,225,383 | 9/1980 | McReynolds | 162/146 |
| 4,265,977 | 5/1981 | Kawamura et al. | 524/458 |
| 4,325,856 | 4/1982 | Ishikawa et al. | 524/458 |
| 4,337,185 | 6/1982 | Wessling et al. | 524/458 |

FOREIGN PATENT DOCUMENTS

| | | | |
|---|---|---|---|
| 0049766 | 4/1982 | European Pat. Off. | 524/458 |
| 412301 | 6/1934 | United Kingdom | 524/458 |
| 902451 | 8/1962 | United Kingdom | 524/458 |
| 1196247 | 6/1970 | United Kingdom | 524/458 |

*Primary Examiner*—Joseph L. Schofer
*Assistant Examiner*—N. Sarofim

[57] ABSTRACT

A selectively stable latex has discrete polymer particles which have present as bound charges both a pH independent charge (such as sulfonium) and a pH dependent charge of opposite polarity of the pH independent charge (such as carboxyl), wherein the two charges are present in such proportion that the latex is stable in at least one pH range and controllably unstable in at least one pH range. The latexes of the invention are extremely useful in the preparation of fibrous composites such as highly-filled composite paper and fine printing paper.

7 Claims, No Drawings

AMPHOTERIC LATEXES CONTAINING PH INDEPENDENT AND PH DEPENDENT BOUND CHARGES

BACKGROUND OF THE INVENTION

This invention relates to latexes having both pH independent and pH dependent bound charges on the surface of the latex particles. This invention also relates to fibrous composites made from such latexes.

In the preparation of latexes, it has become standard practice to employ agents to increase the colloidal stability of the polymer particles. Specifically, it has become a widely employed practice to include small amounts of an addition polymerizable carboxylic acid as a monomer in the latex polymerization. This acid functionality gives the latex increased colloidal stability over a wide pH range. In fact, latexes prepared in this manner are often so stable that intentionally destabilizing them becomes a very difficult task. Further, when such latexes are destabilized, usually by chemical flocculants, the flocculation takes place in a very uncontrolled manner. While some progress in the art of stabilization is taught, for instance, in U.S. Pat. No. 3,261,796 (Simms, 1966) and U.S. Pat. No. 3,637,565 (Sheetz, 1972), there is still a great deal of room for improvement in the field of latex stabilization.

In particular, it would be desirable to have latexes which are stable, but which may be readily and controllably destabilized by the user.

SUMMARY OF THE INVENTION

In one aspect the invention is a selectively stable latex comprising discrete polymer particles which have present as bound charges, a pH independent charge, and a pH dependent charge of opposite polarity of the pH independent charge, wherein the two charges are present in such proportion that the latex is stable in at least one pH range and controllably unstable in at least one pH range. In another aspect, the invention is a fibrous composite prepared from such a latex.

The latexes of the invention are controllably unstable in particular pH ranges, while being stable in other pH ranges. These latexes are extremely useful for preparing fibrous composites such as highly filled composite paper, printing paper, and reinforced plastics.

DETAILED DESCRIPTION OF THE INVENTION

The practice of the invention contemplates the emulsion polymerization of a synthetic latex. By the term "latex" is meant colloidally stable dispersions of discrete water-insoluble particles in an aqueous medium, which are produced by emulsion polymerization. Latexes useful in the invention are generally water-insoluble. They generally have a number average particle diameter of desirably about 20 to about 2,000 nm (nanometers; $10^{-9}$ meters), more desirably about 50 to about 1,000 nm, and preferably about 100 to about 220 nm. The latexes are typically prepared in an aqueous medium with the aid of a surfactant.

In the preparation of the latexes both a pH dependent and a pH independent charge will be provided. Conveniently, the latex is prepared by the emulsion polymerization of at least one noncharged monomer and two appropriately charged monomers or charged prepolymers.

By "pH independent charge" is meant that the moiety providing the charge remains substantially ionized at any pH. By "pH dependent charge" is meant that the moiety will be substantially ionized only under either acidic or alkaline conditions. The pH independent and pH dependent charges may be either anionic or cationic, provided that they are opposite in charge. That is, if the pH independent charge is anionic, then the pH dependent charge must be cationic.

Examples of suitable moieties for providing pH independent anionic charges include those moieties which are generally considered to be strong acids. For instance, sulfonate ($-SO_3^-$), sulfonic ($-SO_3H$), and sulfate ($-SO_4^-$) compounds may be used. As the independent cationic charge, any moiety which is generally a strong base will typically be useful. For instance,

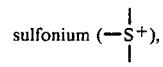

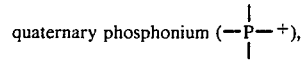

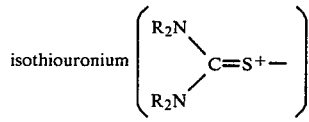

compounds are generally usefu. As the pH dependent anionic charge, those materials generally considered to be weak acids are suitable. For example, carboxyl ($-COO^-$) compounds may be used. As the pH dependent cationic moiety, weak bases are generally suitable. Specific examples include ammonium ($-NH_3^+$) compounds.

A major requirement of the charges of the latexes is that the charges must be bound charges. By "bound charge" is meant that the charge may not be substantially removed from the finished latex by dialysis against distilled water.

The charges may be provided to the latex particles by incorporating an addition polymerizable monomer which contains the appropriate charged moiety. For instance, as the pH independent anionic monomer, 2-sulfoethyl methacrylate may be used. As the pH independent cationic monomer, N,N,N-trimethyl-N-methacrylethyl ammonium chloride may be used. As the pH dependent anionic monomer, acrylic acid, methacrylic acid, itaconic acid, fumaric acid, and maleic half acid esters or amides may be used. As the pH dependent cationic charge, 2-aminoethyl methacrylate hydrochloride may be used.

In a preferred embodiment of the invention, one or both of the charged moieties is provided by an addition polymerizable prepolymer. In a most preferred embodiment, some or all of the bound charge is provided by a reactive polymeric surfactant. Exemplary reactive polymeric surfactants are taught by U.S. patent application Ser. No. 106,063, filed Dec. 20, 1979, now abandoned, which is a continuation-in-part of application Ser. No. 901,925, filed May 1, 1978, now abandoned, both of which are incorporated herein by reference.

In addition to the monomers or prepolymers providing the charged moieties, at least one other polymerizable monomer is needed to prepare the latex. As the "other monomer" virtually any polymerizable compound, which when copolymerized with the monomers or prepolymers providing the charged moieties will result in a latex, may be used.

Preferred species include monovinyl aromatic monomers, acyclic aliphatic conjugated dienes, esters of unsaturated acids with saturated alcohols, and esters of saturated acids with unsaturated alcohols.

The term "monovinyl aromatic monomer" is intended to include those momomers wherein a radical of the formula:

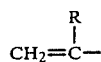

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta- and para-methylstyrene; ortho-, meta- and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinyl aromatic monomer.

The term "acyclic aliphatic conjugated diene" is meant to include, typically, those compounds containing from 4 to about 9 carbon atoms such as, for example, 1,3-butadiene, 2-methyl-1,3-butadiene; 2,3-dimethyl-1,3-butadiene; pentadiene; 2-neopentyl-1,3-butadiene and other hydrocarbon analogs of 2,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred acyclic aliphatic conjugated diene.

The term "esters of unsaturated acids with saturated alcohols" is meant to include, typically, soft acrylates (i.e., those whose hompolymers have a glass transition temperature ($T_g$) of less than about 25° C.) such as benzyl acrylate, butyl acrylate, sec-butyl acrylate, cyclohexyl acrylate, dodecyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc.; hard acrylates (i.e., those whose hompolymers have a $T_g$ of greater than about 25° C.) such as 4-biphenylyl acrylate and tert-butyl acrylate; soft methacrylates such as butyl methacrylate, and hexyl methacrylate; and hard methacrylates such as sec-butyl methacrylate, tert-butyl methacrylate, cyclohexyl methacrylate, ethyl methacrylate, isobutyl methacrylate, isopropyl methacrylate, methyl methacrylate, propyl methacrylate, etc. The cost, availability and known properties of butyl acrylate and ethyl acrylate make these monomers preferred among the acrylates. The cost, availability and known properties of methyl methacrylate make it preferred among the methacrylates.

The term "esters of saturated acids with unsaturated alcohols" is meant to include, typically, vinyl acetate, vinyl propionate, vinyl butyrate, vinyl 2-ethylhexoate, vinyl benzoate, and the like. The low cost and ready availability of vinyl acetate makes it desirable for use in the invention.

As the other monomer, it is often desirable to employ a mixture of two or more monomers. For instance, latexes having both a hard ester and a soft ester, and those having both an acyclic aliphatic conjugated diene and a monovinyl aromatic monomer are especially well known, convenient to make, and have predictable and useful properties.

Especially in instances where preferred classes of monomers are used, it may be desirable to include other monomers in minor amounts, so long as the final properties of the latex are not significantly impaired. For instance, when styrene and 1,3-butadiene are used, it may be desirable to include minor amounts (e.g., 2 weight percent) of a water-soluble monomer such as acrylamide.

The proportions of monomers used in the latex may vary considerably, depending on the particular end use of the binding composition. If more than one "other" monomer is used, they will be present in relative proportion according to the desired properties of the finished latex.

The monomers or prepolymers providing the charged moieties are present in a total amount and in relative proportion to one another such that the latex is colloidally stable at one pH range and controllably unstable at another pH range. Typically, the latexes of the invention will have the pH independent charge present at a charge density of desirably about 0.08 to about 0.4, more desirably about 0.12 to about 0.3, and preferably about 0.15 to about 0.3, meq/g (milliequivalent of charge/g of polymer solids). The net charge density, that is, the difference between the more predominant species and the less predominant species, typically is desirably about 0.02 to about 0.2, more desirably about 0.035 to about 0.18, preferably about 0.07 to about 0.15, meq/g. While either species may be the more predominant one, preferably the pH independent species is more predominant.

The latexes are conveniently prepared by conventional emulsion polymerization techniques in an aqueous medium with conventional additives. Thus, for example, the monomer charge desired to be employed for the latexes is dispersed in an aqueous medium with agitation and thereafter polymerized to produce a latex. The presence of conventional surfactants is optional when a reactive polymeric surfactant is used to provide the charged moieties.

Conventional emulsion polymerization initiators can be employed in the foregoing latex polymerization and common examples thereof include peroxides, persulfates, azo compounds and the like such as AIBN, sodium persulfate, potassium persulfate, ammonium persulfate, hydrogen peroxide, azodiisobutyric diamide as well as initiators (e.g., redox catalyst) which are activated in the water phase (e.g., by a water-soluble reducing agent). Typically, such initiators are employed in a catalytic amount, e.g., ranging from 0.01 to about 5 weight percent based upon the monomer weight. In general, the polymerization is conducted at a temperature in the range of from about $-20°$ to about 110° C. (preferably from about 0° to about 90° C.) and at a pH of from about 2 to about 12, preferably from about 3 to about 11 and especially from about 3.9 to about 9.5.

Similarly, conventional chain transfer agents such as, for example, n-dodecyl mercaptan, bromoform, carbon tetrachloride and the like can also be employed in the normal fashion in the aforementioned first stage polymerization to regulate the molecular weight of the polymer formed therein, and, typically, when such chain transfer agents are used, they are employed in amounts ranging from 0.01 to about 10 (preferably from about 0.1 to about 5) weight percent based upon the weight of the monomers employed in the polymerization.

After polymerization, the latexes are preferably processed to remove any unreacted monomer.

Suitable latex polymerization procedures are taught, for instance, in U.S. Pat. Nos. 4,325,856; 4,001,163; 3,513,121; 3,575,913; 3,634,298; 2,399,684; 2,790,735; 2,880,189; and 2,949,386.

Latex polymerization procedures directed specifically at the incorporation of the reaction polymeric surfactant into the latex are taught, for instance, in U.S. Pat. No. 4,337,185 (Wessling et al., 1982) and U.S. patent application Ser. No. 485,930, filed Apr. 04, 1983 now abandoned (Milks et al.).

When a latex recipe is designed for a particular end use or modified in accordance with the practice of the invention, the resulting latex is generally useful for the intended purpose of the original latex recipe. That is, virtually any latex recipe may be modified according to the teachings of the invention without detrimentally affecting the performance of the latex in its intended end use. In fact, in some applications, certain performance characteristics may be significantly improved.

The latexes of the invention are stable over one pH range and unstable over another pH range. For instance, a latex made with a weak acid and a strong base is generally stable at acidic pH values. However, as the pH is raised, the latex will begin to destabilize, generally somewhere between a pH of about 7 and about 10. Conversely, a latex made from a strong acid and a weak base will be stable at high pH, but as the pH is lowered, it will begin to destabilize at a pH of about 7 to about 4.

The latexes of the invention are extremely useful for preparing fibrous composites such as highly-filled composite papers, fine printing papers, and fiber-filled plastics.

The latexes of the invention are useful in fibrous composites or nonwoven sheets.

The polymeric compositions of the invention may be employed in virtually any composite system; that is, the particular fiber used in the make-up of the composite, and the thickness of the nonwoven composite does not limit the application of the present invention. This is not to say that certain fibers are not more useful for certain composite applications than others, but only that if a fiber has the required specifications to be formed into a web or mat, then the composite so formed may be used in accordance with the present invention.

Fibers useful in the invention include mineral fibers such as fiberglass, synthetic fibers, and natural fibers.

Useful synthetic fibers include: proteinaceous fibers such as those manufactured from casein; polyamides (nylons) such as those derived from the condensation of adipic acid and hexamethylenediamine or the self-condensation of caprolactum; polyesters such as polyethylene glycol terephthalate; acrylic fibers containing a minimum of about 85 percent acrylonitrile with vinyl chloride, vinyl acetate, vinyl pyridine, methacrylonitrile or the like and the so-called modacrylic fibers containing smaller amounts of acrylonitrile; fibers of copolymers of vinyl chloride with vinyl acetate or vinylidene chloride; fibers obtained from the formal derivatives of polyvinyl alcohol; olefin fibers such as polyethylene and polypropylene; and the like.

More preferred fibers include cellulose-based fibers. By "cellulose-based" is meant any fiber which is prepared from cellulose and retains at least some of the ether linkages, hydroxyl moieties and polymeric structure of cellulose, and any synthetic fibers which resemble such cellulose derivatives. Examples of cellulose-based fibers include Chardonnet rayon, viscose rayon, cuprammonium rayon, cellulose acetate, and cellulose triacetate. Still more preferred are natural cellulose fibers, such as cotton, sisal, cantala, henequen, hemp, jute, kenaf, sunn, ramie, and wood fibers. Of the cellulose fibers, wood fibers are preferred. Among the various wood fibers, the more preferred are hardwood and softwood kraft, either bleached or unbleached, with unbleached softwood kraft being most preferred. The preparation of wood fibers (pulp) from wood sources is well known to those skilled in the art.

The fiber and latex are combined in an aqueous medium prior to the formation of the sheet. While not critical to the practice of the invention, it is generally convenient to first disperse the fiber in water (with or without the aid of a dispersing agent), followed by the latex. The fiber is present in a reinforcing amount. That is, sufficient fiber will be present to impart additional physical strength to the composite, compared to a similar composite prepared without a fiber. The latex will be present in a binding amount. That is, sufficient latex will be present to maintain the finished composite in the form of a generally unitary sheet having sufficient body to enable it to be handled without crumbling. The composites of the invention also specifically include so-called "composite papers" which are nonwoven fabrics containing a binder, a fiber, and a nonbinding, nonfibrous filler. These fillers are generally finely divided solids (i.e., powders) such as clay, magnesium hydroxide, or calcium carbonate. Specific teachings of composite paper systems employing latexes are included, for example, in U.S. Pat. No. 4,225,383.

Generally, the composites of the invention will contain desirably about 1 to about 99.9 weight percent fiber based on the total weight of the dried composite. Also, the composites will generally have desirably from about 0.1 to about 99 weight percent (based on solids) of latex, based on the total weight of the dry composite. Further, the composites may have from about 0 to about 95 weight percent of a filler, based on the total weight of the dried composite.

If the latex of the invention is used to make a highly filled composite paper, the composite will contain preferably from about 10 to about 80, most preferably from about 15 to about 70 weight percent fiber, based on the total weight of the dried composite; preferably from about 1 to about 30, most preferably from about 1.5 to about 10 weight percent latex (solids), based on the total weight of the dried composite; and preferably from about 1 to about 90, most preferably from about 30 to about 85 weight percent filler, based on the total weight of the dried composite.

If the latex of the invention is used to make a reinforced composite plastic, the composite will contain preferably from about 5 to about 80, most preferably from about 50 to about 70 weight percent fiber, based on the total weight of the dried composite; preferably from about 20 to about 95, most preferably from about 30 to about 50 weight percent latex (solids), based on the total weight of the dried composite; and preferably from about 5 to about 80, most preferably from about 50 to about 70 weight percent filler, based on the total weight of the dried composite.

Of course, the specific proportion of ingredients will depend upon the particular fiber, filler, and latex used, and upon the desired end use of the composite. For instance, a roofing paper may be very high in filler, but low in latex and fiber. However, a fine printing paper may have a large amount of fiber and latex, with very little or no filler.

The fiber and latex are generally combined in an aqueous medium prior to formation into a sheet. Conveniently, the fiber is dispersed in water, and the latex is then added. While the latexes of the invention will often flocculate when mixed with the fibers (especially, for instance, when less than 3 weight percent latex is used with a cellulose fiber), it is generally preferable to effect flocculation by a change in pH. The pH change may be effected by the addition of any conventional neutralant. Optionally, a chemical flocculating (coagulating) agent may be used. As a flocculant, any substance capable of destablizing the latex dispersion may be used. Examples of suitable flocculants include partially hydrolyzed poly(acrylamide) and other materials generally suitable for flocculating cationic latexes. Depending on the desired properties and available equipment, it may be desirable to either add the flocculant to the fiber dispersion prior to or subsequent to the addition of the latex.

After flocculation is complete, the aqueous slurry is formed into a sheet or web and dewatered. This sheet forming and dewatering process may be accomplished by any conventional paper making apparatus such as a sheet mold or a Fourdrinier or cylinder machine.

After the composite is formed into a dewatered sheet, it may be desirable to densify the sheet by pressing it with a flat press or by sending it through calendering rolls. Drying of the sheet may be either by air drying at ambient conditions or by oven drying.

The composites of the invention may contain other optional ingredients such as UV stabilizers, antioxidants, fire retardants, noncellulose fibers, pigments, perfumes, and so forth. Other general teachings of the use of latexes in the formation of fibrous composite sheets may be found, for example, in U.S. Pat. Nos. 3,875,097; 3,518,113, and West German issued Pat. No. 1 446 609.

The invention is further illustrated with the following examples. In the examples, all parts and percentages are by weight unless otherwise specified.

EXAMPLE 1

Generally following the teachings of U.S. Pat. No. 4,337,185, for making structured particle bound charge cationic latexes, amphoteric latexes are prepared using the following recipes:

| SEED STEP (640 Total Parts Monomer) | |
| --- | --- |
| Styrene | 0–65 |
| Butadiene | 0–35 |
| n-Dodecanethiol | 0–0.2 (B.O.M.) |
| VAZO ® 64 (azobisisobutyronitrile) | 0–0.78 (B.O.M.) |
| Reactive Polymeric Surfactant | 9–13 (B.O.M.) |
| Methacrylic Acid | 0–5 |
| Methylmethacrylate | 0–50 |
| n-Butylacrylate | 0–50 |
| Hydrogen Peroxide | 0–0.77 |

(B.O.M = based on monomer)

Those made from styrene/butadiene compositions are polymerized for 1.5 hours at 70° C., and those made from acrylates are polymerized for 3 hours at 50° C.

The reactive polymeric surfactant (RPS) is a low molecular weight copolymer ($\overline{DP}_n \sim 34$) prepared from 63 parts methylmethacrylate, 27 parts vinylbenzyl chloride, and 10 parts vinylbenzyl dimethyldodecyl quaternary ammonium chloride, which is then reacted with N8 parts dimethyl sulfide and N7 parts dimethylaminoethyl methacrylate to form the water-soluble structure containing/1 hydrophobe per molecule and N1.8 reactive methacrylate vinyls per chain. The ratio of sulfonium to quaternary ammonium charge is about 2:1 and the charge density measures N1.8 meq $Cl^{\ominus}$/g polymer solids. The following structure indicates composition by mole fraction:

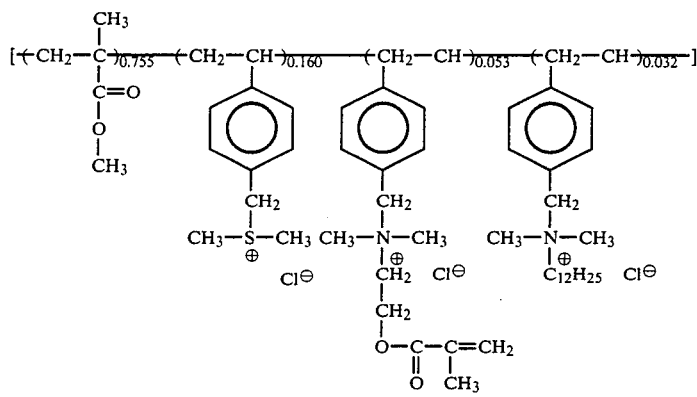

This reactive polymeric surfactant is prepared generally according to the teachings of U.S. patent application Ser. No. 106,063, filed Dec. 20, 1979 now abandoned.

The above-described seed latex is then further polymerized (2 hours at 70° C. for the styrene/butadiene composition and 3 hours at 50° C. for the acrylate systems) with a linear continuous addition of the following compositions:

| GROWTH STEP (480 Total Parts Monomer) | |
|---|---|
| Styrene | 0–65 |
| Butadiene | 0–35 |
| n-Dodecanethiol | 0–0.2 |
| Methacrylic Acid | 0–5 |
| Methylmethacrylate | 0–36 |

| -continued | |
|---|---|
| GROWTH STEP (480 Total Parts Monomer) | |
| n-Butylacrylate | 0–60 |

The growth latex is then allowed to cook down for at least an additional 2 hours and terminated by cooling or followed by a final 1.5 hours, 70° C. capping step with a dual linear addition of monomer and the RPS. This latex is then allowed to cook down for an additional 3 hours at 70° C.

| CAP STEP (Optional) (480 Total Parts Monomer Plus RPS) | |
|---|---|
| Styrene | 60–64 |
| Butadiene | 33–35 |
| Methacrylic Acid | 2–6.5 |
| RPS | 14.3 |

Various compositions of styrene/butadiene and acrylate amphoteric latexes with seed, growth and some including cap steps are listed in Table I.

TABLE I

| Sample No. | Seed (640 Parts Monomer) | Growth (480 Parts Monomer) | Cap (480 Parts Monomer + RPS) | % Conv.[1] | Vacuum % Solids[2] | Particle Size[3] (nm) | Flocculation[4] at pH = 7 | Flocculation at pH = 8.5 | Flocculation at pH = 10 | Total meq Cl−/ g Solids[5] | Bound meq Cl−/ g Solids[6] | Charge Ratio[7] | meq MAA/ g Solids[8] | Δ Charge[9] |
|---|---|---|---|---|---|---|---|---|---|---|---|---|---|---|
| 1-C* | 65/35/0.2/9.38/0.781 S/B/DT/RPS/AIBN | 65/35/0.2 S/B/DT | None | 91.2 | 27.2 | 94.0 | O | O | O | 0.0955 | 0.0710 | 0 | — | Control |
| 2-C* | 65/35/0.2/9.38/0.781 S/B/DT/RPS/AIBN | 65/35/0.2 S/B/DT | 420 parts = 63.7/34.3/2.05 S/B/MAA; 60 parts = RPS | 90.4 | 36.7 | 107.0 | O | O | O | 0.1375 | 0.068 | 0.485 | 0.0667 | 0.071 |
| 1 | 65/35/0.2/9.38/0.781 | 65/35/0.2 | 420 parts = 62.2/33.5/4.33 S/B/MAA; 60 parts = RPS | 91.0 | 36.7 | 110.0 | O | O | X | 0.139 | 0.046 | 1.01 | 0.140 | 0.001 |
| 2 | 63/35/2.0/0.20/9.38/0.781 S/B/MAA/DT/RPS/AIBN | 63/35/2.0/0.2 S/B/MAA/DT | None | 92.8 | 32.5 | 94.0 | X | — | — | 0.100 | 0.020 | 2.38 | 0.238 | 0.138 |
| 3 | 60/35/5.0/0.20/9.38/0.781 S/B/MAA/DT/RPS/AIBN | 60/35/5.0/0.2 S/B/MAA/DT | None | 93.8 | 32.3 | 94.0 | O | O | X | 0.100 | 0.020 | 5.88 | 0.588 | 0.488 |
| 4 | 62/35/3.0/0.20/9.38/0.781 S/B/MAA/DT/RPS/AIBN | 62/35/3.0/0.20 S/B/MAA/DT | None | 92.8 | 31.8 | 105.0 | O | X | — | 0.100 | 0.020 | 3.56 | 0.356 | 0.256 |
| 5 | 62/35/1.5/0.20/9.38/0.781 S/B/MAA/DT/RPS/AIBN | 63.5/35/1.5/0.20 S/B/MAA/DT | None | 92.2 | 31.7 | 94.0 | X | — | — | 0.104 | 0.022 | 1.72 | 0.179 | 0.075 |
| 6 | 64/35/1.0/0.20/9.38/0.781 S/B/MAA/DT/RPS/AIBN | 64/35/1.0/0.20 S/B/MAA/DT | None | 92.5 | 31.5 | 88.5 | O | X | — | 0.101 | 0.028 | 0.805 | 0.0813 | 0.020 |
| 7 | 64/35/1.0/0.20/9.38/0.781 S/B/MAA/DT/RPS/AIBN | 64/35/1.0/0.20 S/B/MAA/DT | 420 parts = 60.7/33.6/6.43 S/B/MAA; 60 parts = RPS | 100 | 36.7 | 97.5 | X | — | — | 0.134 | 0.028 | 2.07 | 0.277 | 0.143 |
| 8 | 64/35/1.0/0.20/9.38/0.781 S/B/MAA/DT/RPS/AIBN | 64/35/1.0/0.20 S/B/MAA/DT | 420 parts = 60.7/35/4.28 S/B/MAA; 60 parts = RPS | 100 | 37.1 | 99.5 | X | — | — | 0.139 | 0.041 | 1.53 | 0.212 | 0.073 |
| 9 | (100 parts monomer) 50/50/13.0/0.875 NMA/n-BA/RPS/HP | (66.7 parts monomer) 36/60/4 NMA/n-BA/MAA | None | 99.2 | 26.9 | 92.0 | X | — | — | 0.121 | 0.0347 | 1.15 | 0.139 | 0.018 |

Note:
The following abbreviations are used in this table: S = styrene; B = butadiene; DT = n-dodecanethiol; RPS = reactive polymeric surfactant; MAA = methacrylic acid; AIBN = azobisisobutyronitrile; n-BA = n-butyl acrylate; HP = hydrogen peroxide; NMA = methyl methacrylate.
*Not an example of the invention.
[1]Percent conversion of monomer to polymer as determined by reactor solids.
[2]Percent Solids after removal of unreacted monomer.
[3]Average diameter in nanometers (nm = $10^{-9}$ meters) as measured by light scattering.
[4]The pH was raised to 7, 8.5, and 10 with ammonium hydroxide. O indicates no flocculation, X indicates flocculation, and — indicates flocculated at lower pH.
[5]Milliequivalents Cl− charge/gram of latex solids.
[6]Milliequivalent of bound charge as determined by measurement after dialysis of the latex against deionized water. Values for all samples except C are artificially low due to the measurement technique used and the presence of MAA (—COO−).
[7]Ratio of anionic species to cationic species, as determined by monomer charged to the reactor.
[8]Milliequivalents of MAA per gram of latex solids as determined by monomer charged to the reactor.
[9]Cationic charge − anionic charge = Δ charge (absolute values).

What is claimed is:

1. A selectively stable latex comprising discrete polymer particles which have present as bound charges both
   (a) a pH independent charge present at a charge density of about 0.8 to about 0.4 meq/g; and
   (b) a pH dependent charge, of opposite polarity of the pH independent charge;
   wherein the two charges are provided by an addition polymerizable monomer and are present in such proportion that the net charge density is about 0.02 to about 0.2 meq/g and the latex is stable in at least one pH range and controllably unstable in at least one pH range.

2. The latex of claim 1 wherein the pH independent charge is cationic and the pH dependent charge is anionic.

3. The latex of claim 2 wherein the pH independent charge is provided by a sulfonium compound and the pH dependent charge is provided by a carboxyl compound.

4. The latex of claim 1 wherein the potential net charge of the latex particles is about 0.02 to about 0.2 meq/g.

5. The latex of claim 4 wherein the pH independent charge is provided by a sulfonate, sulfate, or sulfonic compound, and the pH dependent charge is provided by an ammonium compound.

6. A method of producing the latex of claim 1 comprising:
   (a) a first step of emulsion polymerizing a monomer bearing a pH independent charge present at a charge density of about 0.08 to about 0.4 meq/g, and at least one other monomer; and
   (b) a second step of emulsion polymerizing, in the presence of the product of the first step, a monomer bearing a pH dependent charge opposite in polarity to the pH independent charge, whereby, the net charge density is about 0.02 to about 0.2 meq/g, and at least one other monomer.

7. The method of claim 6 wherein the monomer bearing a pH independent charge has surfactant properties, and no other surfactant is added to the first step polymerization.

* * * * *

UNITED STATES PATENT AND TRADEMARK OFFICE
CERTIFICATE OF CORRECTION

PATENT NO. : 4,544,697

DATED : October 1, 1985

INVENTOR(S) : Dale M. Pickelman et al.

It is certified that error appears in the above-identified patent and that said Letters Patent is hereby corrected as shown below:

Col. 2, line 43, "usefu" should read --useful--.

Col. 3, line 21, "momomers" should read --monomers--; line 63, and also Col. 4, line 2, "hompolymers" should read --homopolymers--.

Under the footnote for Table I, "NMA" should read --MMA--.

Claim 1, Col. 13, line 6, "0.8" should read --0.08--.

Signed and Sealed this

Twenty-fifth Day of February 1986

[SEAL]

Attest:

DONALD J. QUIGG

Attesting Officer

Commissioner of Patents and Trademarks